US012790191B2

(12) United States Patent
Brehier et al.

(10) Patent No.: US 12,790,191 B2
(45) Date of Patent: Nov. 10, 2026

(54) MACHINE FOR HANDLING A LOAD OR A PERSON

(71) Applicant: MANITOU BF, Ancenis (FR)

(72) Inventors: Valentin Brehier, Ancenis (FR); Charlotte Lair, Ancenis (FR); Guillaume Gabillard, Ancenis (FR)

(73) Assignee: MANITOU BF, Ancenis (FR)

( * ) Notice: Subject to any disclaimer, the term of this patent is extended or adjusted under 35 U.S.C. 154(b) by 200 days.

(21) Appl. No.: 18/696,577

(22) PCT Filed: Aug. 30, 2022

(86) PCT No.: PCT/FR2022/051625
§ 371 (c)(1),
(2) Date: Mar. 28, 2024

(87) PCT Pub. No.: WO2023/052696
PCT Pub. Date: Apr. 6, 2023

(65) Prior Publication Data
US 2025/0033942 A1 Jan. 30, 2025

(30) Foreign Application Priority Data
Sep. 29, 2021 (FR) ...................................... 2110245

(51) Int. Cl.
*G08B 21/00* (2006.01)
*B66F 9/065* (2006.01)
(Continued)

(52) U.S. Cl.
CPC ................ *B66F 9/24* (2013.01); *B66F 9/065* (2013.01); *B66F 9/07581* (2013.01);
(Continued)

(58) Field of Classification Search
CPC ........ B66F 9/24; B66F 9/065; B66F 9/07581; B66F 9/0759; B66F 9/0655; E02F 3/96; E02F 9/205
(Continued)

(56) References Cited

U.S. PATENT DOCUMENTS 10,035,462 B2 7/2018 Iotti
10,124,773 B1 * 11/2018 Mourlam .................. B60S 9/12
(Continued)

FOREIGN PATENT DOCUMENTS

DE 29806492 U1 7/1998
EP 3287413 A1 2/2018

OTHER PUBLICATIONS

International Search Report and Written Opinion dated Dec. 8, 2022 for Intl Pat. Appl. No. PCT/FR2022/051625.

*Primary Examiner* — Anh V La
(74) *Attorney, Agent, or Firm* — Husch Blackwell LLP

(57) ABSTRACT

A handling vehicle including a rolling chassis having a first part and a second part and two lateral sides connecting the first and second parts, a handling system borne by the chassis, and comprising a rotary turntable topped by a pivoting arm mounted so as to be able to pivot on the turntable between a lowered position and a raised position, at least one driver station of the vehicle which is borne by the chassis and delimits a location for an operator, at least one control member for controlling the members for driving movement along the ground, and at least one control system for controlling the handling system. The driver station of the vehicle is in at least two parts and comprises a lower part secured to the chassis and disposed along a lateral side of the chassis and an upper part that moves as one with the turntable.

20 Claims, 7 Drawing Sheets

(51) Int. Cl.

| | |
|---|---|
| ***B66F 9/075*** | (2006.01) |
| ***B66F 9/24*** | (2006.01) |
| *E02F 3/96* | (2006.01) |
| *E02F 9/20* | (2006.01) |

(52) U.S. Cl.
CPC .............. *B66F 9/0759* (2013.01); *E02F 3/96* (2013.01); *E02F 9/205* (2013.01)

(58) Field of Classification Search
USPC ......................... 340/540, 500, 685, 679, 684
See application file for complete search history.

(56) References Cited

U.S. PATENT DOCUMENTS

| | | | | |
|---|---|---|---|---|
| 10,457,533 | B2 * | 10/2019 | Puszkiewicz | B66F 9/07559 |
| 2002/0037211 | A1 * | 3/2002 | Korycan | E02F 9/2275 414/501 |
| 2021/0221663 | A1 | 7/2021 | Masters | |
| 2021/0276845 | A1 | 9/2021 | Gilbride | |

* cited by examiner

MACHINE FOR HANDLING A LOAD OR A PERSON

BACKGROUND

The present disclosure relates to a load-handling or person-handling vehicle.

It relates in particular to a load-handling or person-handling vehicle comprising at least:

- a chassis fitted with members for driving the movement along the ground, such as wheels, and having a first part and a second part that are able to form, depending on the direction of movement of the chassis, the one the front and the other the rear of said chassis, and two lateral sides connecting the first and second parts,
- a load-handling or person-handling system borne by the chassis, this handling system comprising a rotary turntable topped by a pivoting arm mounted so as to be able to pivot on the turntable about an axis, referred to as horizontal, orthogonal to the axis of rotation, referred to as vertical, of the turntable for movement of the arm between a lowered position and a raised position,
- at least one driver station of the vehicle which is borne by the chassis of the vehicle and delimits a location for receiving an operator,
- at least one member for controlling the members for driving the movement along the ground, and
- at least one system for controlling the handling system, the or at least one of the control systems being configured to allow said handling system of the vehicle to be controlled at least outside of the or at least one of the driver stations of the vehicle.

Such a vehicle is known, as illustrated for example by the patent EP 3 287 413 or the patent US 2021/276845. Manufacturers of such vehicles are in search of solutions which offer great versatility of the vehicle without adversely affecting its compactness in particular in terms of height.

SUMMARY

To this end, the subject of the disclosure is a load-handling or person-handling vehicle comprising at least:

- a chassis fitted with members for driving the movement along the ground and having a first part and a second part that are able to form, depending on the direction of movement of the chassis, the one the front and the other the rear of said chassis, and two lateral sides connecting the first and second parts,
- a load-handling or person-handling system borne by the chassis, this handling system comprising a rotary turntable topped by a pivoting arm mounted so as to be able to pivot on the turntable about an axis, referred to as horizontal, orthogonal to the axis of rotation, referred to as vertical, of the turntable for movement of the arm between a lowered position and a raised position,
- at least one driver station of the vehicle which is borne by the chassis of the vehicle and delimits a location inside which an operator is able to take up position,
- at least one member for controlling the members for driving the movement along the ground, and
- at least one system for controlling the handling system, the or at least one of the control systems being configured to allow said handling system of the vehicle to be controlled at least outside of the driver station or stations of the vehicle, characterized in that the or at least one of the driver stations of the vehicle is in at least two parts, and in that the or each driver station in at least two parts comprises at least a lower part secured to the chassis and disposed along a lateral side of the chassis and an upper part that moves as one with the turntable. This design of the driver station limits the space requirement of the vehicle in terms of height without adversely affecting the versatility of the vehicle. This design also limits the risks of an accident due to the easy accessibility to the driver station. The presence of such a driver station joined to the chassis makes it possible to drive the movement of the vehicle at high speeds between two handling operations. The configuration of the vehicle allows the vehicle to be controlled from a position alongside the vehicle, or in the driver station or stations in at least two parts or else in a driver station formed by a basket when the handling system borne by the chassis is fitted with such a basket at the end of the pivoting arm. This results in great versatility of the vehicle without adversely affecting its compactness in terms of height.

According to one embodiment of the disclosure, there being two driver stations in at least two parts, the lower part, secured to the chassis, of one of said driver stations is disposed along a lateral side of the chassis and the lower part, secured to the chassis, of the other of said driver stations is disposed along the opposite lateral side of the chassis of the vehicle, and the upper part of one of said driver stations and the upper part of the other of said driver stations are common and form one and the same upper part configured to cooperate with the one or the other of the lower parts depending on the angular position of the turntable. The upper part common to the driver stations is configured to, in a first angular position of the turntable in which the pivoting arm extends from its pivoting connection to the turntable toward the first part of the chassis, cooperate with one of the lower parts to form a first driver station facing the first part of the chassis, and to, in a second angular position of the turntable in which the pivoting arm extends from its pivoting connection to the turntable toward the second part of the chassis, cooperate with the other of the lower parts to form a second driver station facing the second part of the chassis. This arrangement makes it possible to have two driver stations, one for each direction of movement of the vehicle, depending on the orientation of the turntable without significantly increasing the cost of the vehicle. The first and second positions of the turntable are generally offset by 180° to within plus or minus 20°.

According to one embodiment of the disclosure, the lower part of the or of at least one, preferably of each of the driver stations in at least two parts comprises a floor, and the upper part a backrest. Preferably, the or at least one of the driver stations in at least two parts comprises a seat pan. Said seat pan is preferably disposed on the upper part of said driver station.

According to one embodiment of the disclosure, the or at least one, preferably each of the driver stations in at least two parts has what is referred to as an operational configuration in which the upper part is disposed above, and at least partially vertically with respect to, the lower part of said driver station. In this operational configuration, an operator is able to take up position in the driver station. In this operational configuration, the upper part and the lower part form between them a control cabin.

According to one embodiment of the disclosure, the vehicle comprises at least one system for detecting the operational configuration of the driver station. The presence of a system for detecting the operational configuration of the driver station for the or each driver station in at least two parts makes it possible to notify the operator that the operational configuration has been reached. The operator can then command that the rotation of the turntable be blocked with the driver station in the operational configuration.

According to one embodiment of the disclosure, the system for detecting the operational configuration of the driver station comprises an inductive sensor and at least one metallic component, the inductive sensor and the metallic component being fitted, without preference, the one to the turntable and the other to the chassis.

According to one embodiment of the disclosure, the vehicle comprises at least one member for locking the upper part of the or of at least one of the driver stations in the operational configuration. According to one embodiment of the disclosure, said locking member is formed by a locking finger. This locking finger is borne by the lower or, respectively, upper part of the driver station and is mounted so as to be able to move between an inactive position and an active position in which it is inserted in a recess provided in the upper or, respectively, lower part of the driver station.

Preferably, the locking finger and the associated recess form a tapered push-fit.

Preferably, the locking member forms, in cooperation with the associated recess, a stop configured to prevent an inclination of the upper part of the driver station toward the first or the second part of the chassis forming the front of the chassis.

The vehicle comprises at least one control for the passage of said locking member from one position to the other. This control is actuatable by the operator when the operational configuration of the driver station to be locked is detected.

According to one embodiment of the disclosure, the vehicle comprises, for the or each driver station in at least two parts, at least one presence sensor in said driver station. The presence of such a presence sensor makes it possible to modify, for example, the control laws of the vehicle when the operator is present in the or one of the driver stations in at least two parts. Under these conditions, it is thus possible, for example, to increase the maximum movement speed able to be reached by the vehicle.

According to one embodiment of the disclosure, the or at least one of the members for controlling the members for driving the movement of the vehicle along the ground and the or one of the systems for controlling the handling system are integrated into a control console. The vehicle may, without preference, comprise one or more control consoles.

According to one embodiment of the disclosure, the control console can be removably coupled to at least one of the upper or lower parts of the or of at least one of the driver stations in at least two parts, and the system for controlling the handling system in the control console is, in the state decoupled from the driver station, able to form at least that system for controlling the handling system which is configured to allow said handling system of the vehicle to be controlled outside of the driver station or stations of the vehicle. This control console can also be used in a basket of the handling system when the free end of the pivoting arm of the handling system is fitted with such a basket.

According to one embodiment of the disclosure, the members for driving the movement of the vehicle along the ground are wheels, at least one of which is coupled to a drive system for driving said wheel in rotation.

According to one embodiment of the disclosure, the upper part of the or of at least one, preferably of each of the driver stations in at least two parts which comprises a backrest also comprises a seat pan forming a seat.

Preferably, this seat pan forming a seat is disposed at the base of the backrest.

According to one embodiment of the disclosure, at least the backrest is mounted so as to be able to pivot about a pivot axis, referred to as horizontal, extending transversely with respect to the forward/rearward direction of the chassis.

The backrest is mounted so as to be able to pivot between an upright position in which the operator can take up position on the seat pan and a lying-flat position. The pivoting of the backrest prevents access to the driver station when the backrest is pivotably moved toward the first or the second part of the chassis forming the front of said chassis and corresponding to the lying-flat position of the backrest.

According to one embodiment of the disclosure, the vehicle comprises at least one sensor for detecting the position of the backrest.

The control unit of the vehicle is configured to block the rotation of the turntable when the backrest is in the upright position and permit the rotation of the turntable when the backrest is in the lying-flat position.

BRIEF DESCRIPTION OF THE DRAWINGS

The disclosure will be clearly understood on reading the following description of exemplary embodiments, with reference to the appended drawings, in which.

DESCRIPTION

Figure 1:
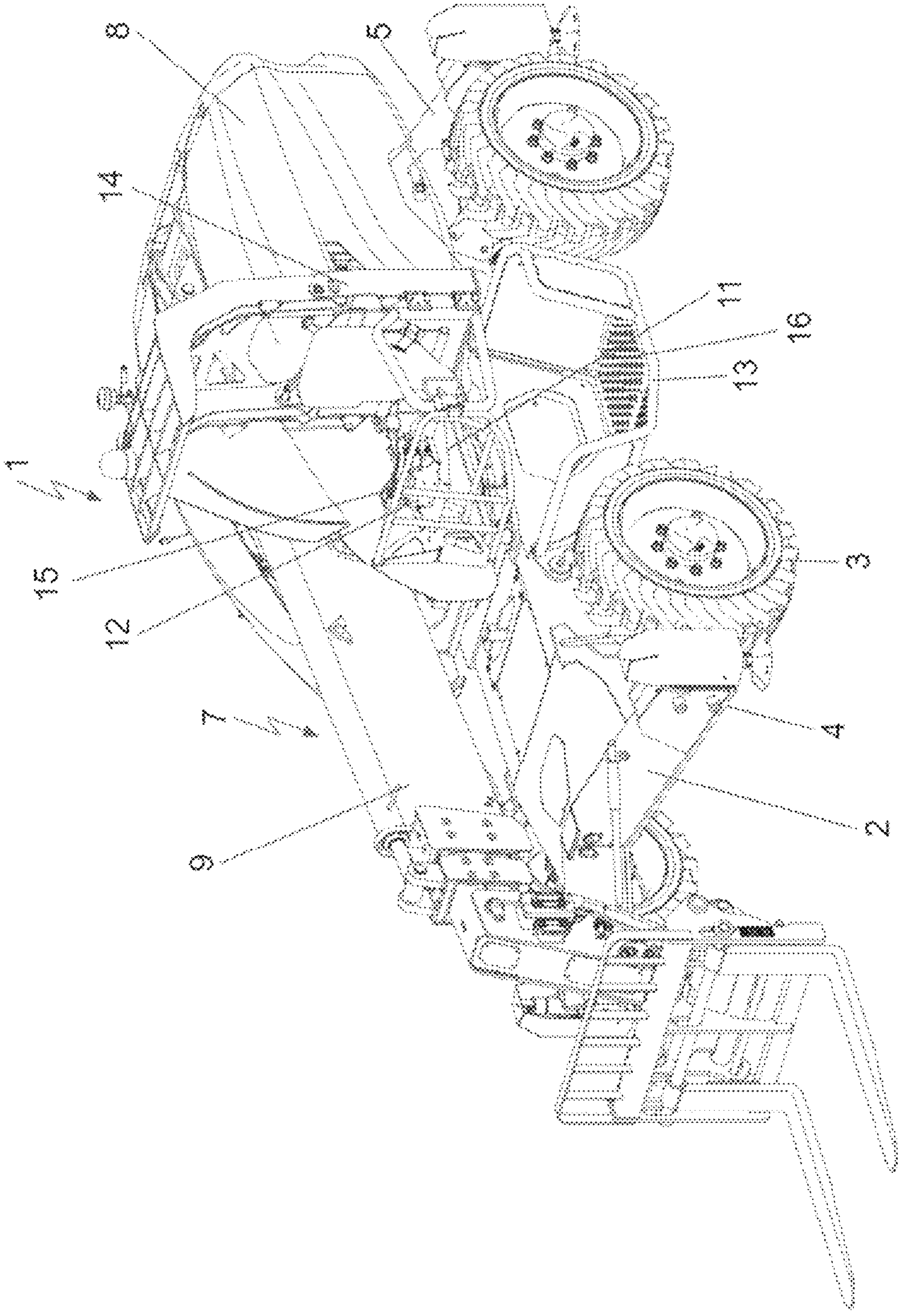
FIG. 1 shows a perspective view of a handling vehicle according to the disclosure, with a driver station in the operational configuration.

As mentioned above, the disclosure relates to a load-handling or person-handling vehicle 1.

This vehicle 1 comprises a mobile chassis 2 fitted with members 3 for driving the movement of the chassis 2 along the ground. In the examples shown, the members 3 for driving the movement of the chassis 2 along the ground are wheels, but could be formed by caterpillar tracks in an equivalent manner. There may be three or four of these wheels, as in the example shown.

The chassis 2 is fitted with a drive system 24 for driving at least one of the wheels in rotation.

The vehicle 1 may be a vehicle with two or four driving wheels, and the drive system 24 may be a hydraulic or thermal or electrical system, without departing from the scope of the disclosure.

Such a drive system will not be described in more detail because it is well known to those skilled in this art.

The chassis 2 has a longitudinal axis, a first part 4 and a second part 5 constituting the transverse ends of the chassis 2. Depending on the direction of movement of the chassis 2, the first part 4 forms the front of the chassis 2 and the second part 5 the rear of the chassis 2, or vice versa.

This first part and this second part are connected to one another by the two lateral sides 6 or flanks of the chassis 2.

The vehicle 1 also comprises a load-handling and/or person-handling system 7 borne by the chassis 2. This handling system 7 comprises a rotary turntable 8. The rotary turntable 8 is mounted so as to be able to rotate about an axis of rotation, referred to as vertical, extending vertically in the state when the vehicle is positioned on a horizontal flat surface. The turntable 8 is topped by a pivoting arm 9 mounted so as to be able to pivot on the turntable 8 about an axis, referred to as horizontal, orthogonal to the vertical axis of rotation of the turntable 8 for movement of the arm 9 between a lowered position and a raised position.

The pivoting connection between the turntable 8 and the arm 9 is shown at 10 in the figures.

The free end of the pivoting arm 9, opposite the end coupled to the turntable 8, may be fitted with a load-handling accessory or tool, such as a bucket or a fork, as shown for the handling of a load.

This free end of the pivoting arm 9 may also be fitted with a basket for lifting a person.

The vehicle 1 also comprises at least one driver station 11 borne by the chassis 2 of the vehicle. An operator is able to take up position inside the or each driver station borne by the chassis 2 of the vehicle. Each driver station therefore delimits a location for receiving an operator. Thus the basket, when it is present, can constitute a driver station of the vehicle.

Such a driver station may be borne directly or indirectly by the vehicle 1. Thus, in the case of a driver station formed of a basket, the chassis bears the turntable 8, the turntable in turn bears the arm 9 which in turn bears the basket and therefore a driver station.

The vehicle 1 also comprises at least one member 15 for controlling the members for driving the movement of the chassis 2 along the ground. This control member 15, such as a pivoting lever, also called joystick, makes it possible to control the drive system 24 which in turn allows the wheels to be driven in rotation.

This control member 15 is able to be positioned in at least one of the driver stations.

The vehicle 1 also comprises at least one system 12 for controlling the handling system 7. The or at least one of the control systems 12 is configured to allow the handling system of the vehicle to be controlled at least outside of the driver station or stations of the vehicle.

Thus, it is possible for an operator positioned alongside the vehicle 1 to control the handling system 7 using the or one of the control systems 12.

Again, the or one of the control systems 12 may be in the form of a pivoting lever, possibly fitted with buttons or other control members.

The actuation of the lever or of the control members borne by the lever makes it possible to control the pivoting movement of the arm, the driving of the turntable in rotation, the extension of the arm when the arm is a telescopic arm and possibly the movement of the accessory or tool borne at the end of the arm.

Again, such a control system will not be described in detail because it is well known to those skilled in this art.

In the examples shown, the member 15 for controlling the members 3 for driving the movement of the vehicle along the ground and the system 12 for controlling the handling system 7 are integrated into a control console 121.

The vehicle may comprise a single control console or a number of control consoles. In the case of a plurality of control consoles, at least some of the control consoles may be permanently installed in the driver station or stations.

Figure 2:
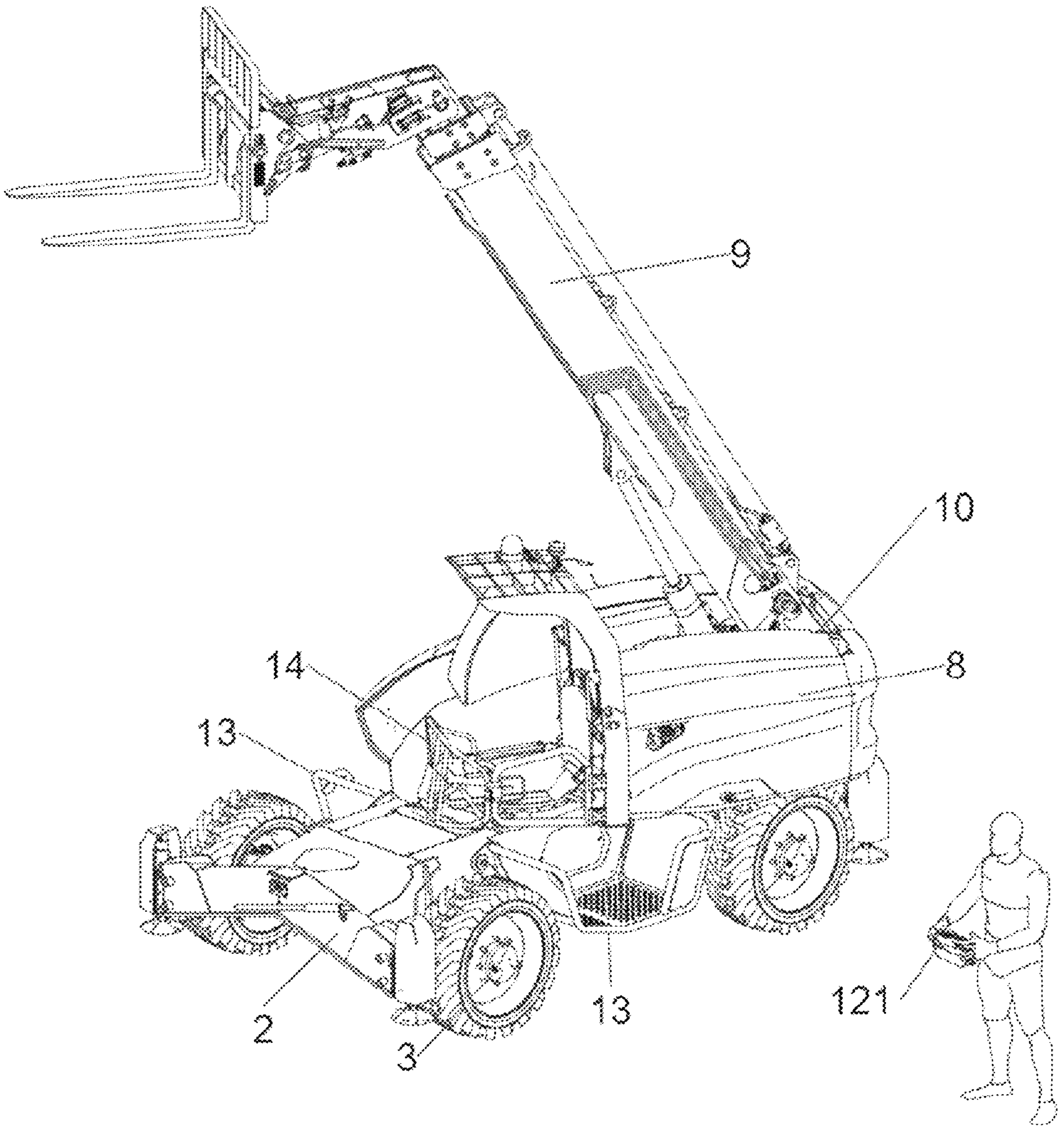
FIG. 2 shows a perspective view of a handling vehicle according to the disclosure, in which the vehicle is controlled from outside the vehicle.

In the examples shown, the control console 121 is the only one. This control console 121 may be accessible to the operator from outside the vehicle as illustrated in FIG. 2 in which this control console 121 forms the equivalent of a remote control carried by the operator who is positioned alongside the vehicle.

Such a control console 121 may also be disposed in a driver station 11 of the vehicle.

As mentioned above, when such a control console 121 is disposed in a driver station 11 of the vehicle, it may be installed permanently or removably in said driver station 11.

The vehicle 1 may also comprise control consoles, with some of them only incorporating the function of controlling the handling system. This may be the case when the vehicle is fitted with a basket and this basket is fitted with a control console and the control of the movement of the vehicle along the ground is not permitted from said basket.

The example shown illustrates the case of a vehicle comprising a single control console mounted removably in the driver stations. The zone where the control console 121 is coupled to a driver station is shown at 23 in the figures.

In a manner which is characteristic of the disclosure, the or at least one of the driver stations 11 of the vehicle is in at least two parts, and the or each driver station 11 in at least two parts comprises at least a lower part 13 secured to the chassis 2 and disposed along a lateral side 6 of the chassis 2 and an upper part 14 that moves as one with the turntable 8. Thus, this upper part 14 moves in parallel with the rotation of the turntable 8.

Figure 3:
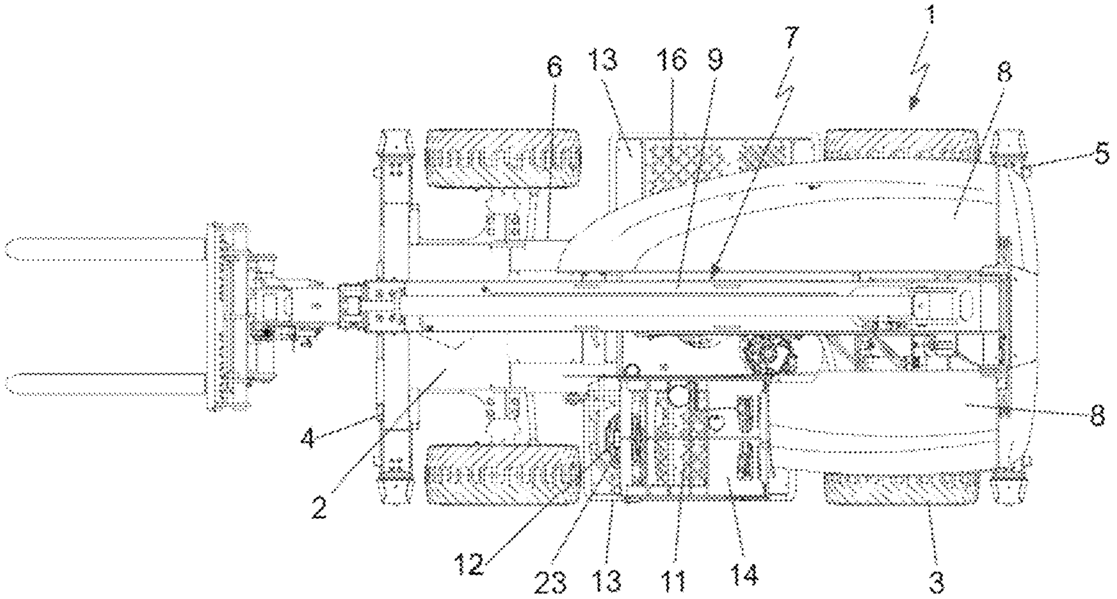
FIG. 3 shows a top view of a handling vehicle according to the disclosure, with the first driver station in the operational configuration.
Figure 4:
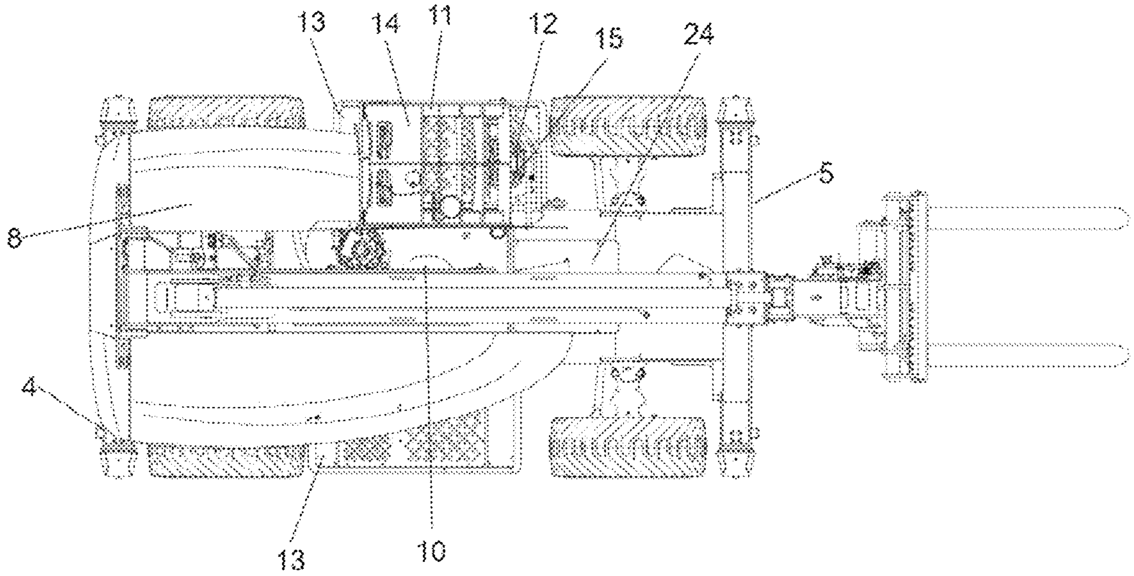
FIG. 4 shows a top view of a handling vehicle according to the disclosure, with the second driver station in the operational configuration.
Figure 5:
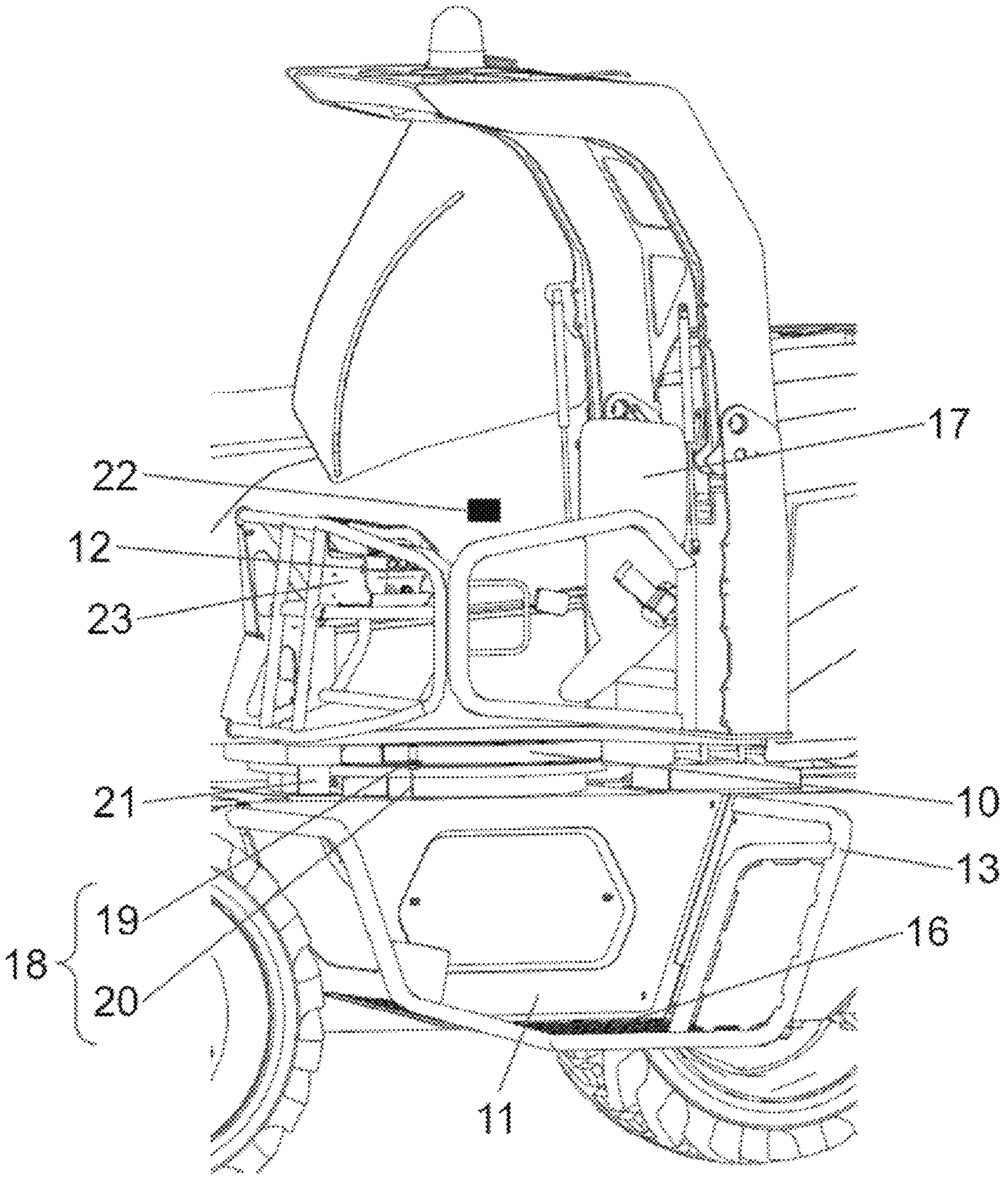
FIG. 5 shows a partial perspective view of a driver station.
Figure 6:
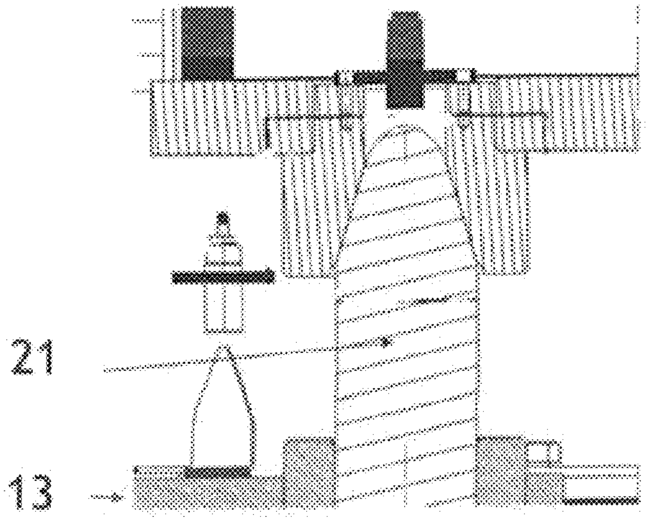
FIG. 6 shows a detail view of the locking member and of the associated recess.

The load-handling vehicle 1 may be fitted with a single driver station in at least two parts or several driver stations 11 in at least two parts as in the example shown in FIGS. 3 and 4.

Specifically, in FIGS. 3 and 4, there are two driver stations 11 in at least two parts. The lower part, secured to the chassis, of one of the driver stations is disposed along a lateral side 6 of the chassis 2 and the lower part 13, secured to the chassis 2, of the other of said driver stations is disposed along the opposite lateral side 6 of the chassis 2 of the vehicle.

The upper part 14 of one of the driver stations 11 and the upper part 14 of the other of the driver stations are common and form one and the same upper part 14 configured to cooperate with the one or the other of the lower parts 13 depending on the angular position of the turntable 8.

Thus, the upper part 14 of one of the driver stations 11 is configured to, in a first angular position of the turntable 8 in which the pivoting arm 9 extends from its pivoting connection to the turntable 8 toward the first part 4 of the chassis 2, cooperate with one of the lower parts 13 to form a first driver station facing the first part 4 of the chassis 2, as illustrated in FIG. 3.

This upper part 14 is also configured to, in a second angular position of the turntable 8 in which the pivoting arm 9 extends from its pivoting connection to the turntable 8 toward the second part 5 of the chassis 2, cooperate with the other of the lower parts 13 to form a second driver station facing the second part 5 of the chassis 2, as illustrated in FIG. 4.

The pivoting arm is offset by 180° between the first and second positions of the turntable. The operator can thus see the end of the pivoting arm in the two directions of movement of the vehicle.

Of course, the member or members for controlling the members for driving the movement of the vehicle along the ground are adapted during operation depending on the driver station that they are fitted to. Likewise, the assembly formed by the turntable and the upper part of the or of at least one of the driver stations is configured to move in a space extending above the lower part of the driver station or stations in at least two parts so as to not collide with the lower part or parts during the rotation of the turntable.

Such a driver station 11 in at least two parts can have a large number of forms. Generally, the lower part 13 of the or of at least one, in this instance of each of the driver stations 11 in at least two parts comprises a floor 16, whereas the upper part 14 of said driver station comprises a backrest 17 against which the operator can rest with their back.

The or each of the driver stations 11 in at least two parts has what is referred to as an operational configuration in which the upper part 14 is disposed above, and at least partially vertically with respect to, the lower part 13 of said driver station 11. It is in this operational configuration that the operator can take up position inside the driver station. In this operational configuration, the upper and lower parts form between them a control cabin.

The upper part 14 of the driver station 11 forms the upper part of the cabin. This upper part delimits an enclosure topped by a roof. The inside of the enclosure is accessible through a door or a gate provided in said enclosure. It should be noted that the roof and part of the rear face of the or of at least one of the driver stations may move as one and form a protective assembly. This assembly may have a first configuration, referred to as active configuration, for protecting the location for receiving an operator in which the roof is in a raised position, and a second configuration in which the roof is in a lowered position. This assembly is mounted so as to be able to pivot about an axis transverse to the longitudinal axis of the chassis corresponding to the forward/rearward direction of the chassis and is configured to pass from the first configuration to the second configuration by pivoting movement toward the first or the second part of the chassis forming the front of the chassis. The vehicle may comprise a mechanism for locking said assembly in each of the first and second configurations. This design allows the assembly forming a system for protecting against rollover or falling objects to simply and quickly pass from the first configuration in which the vehicle can be controlled from the driver station to a second configuration in which the vehicle can be controlled from a location outside of the driver station or stations. The simple pivoting movement of the assembly toward the front allows such a passage from the first to the second configuration. Conversely, the simple pivoting movement of the assembly toward the rear can allow passage from the second configuration to the first configuration. No removal of components is necessary. The presence of an active locking mechanism in the two configurations makes it possible to avoid, in the first configuration, an unintentional pivoting movement of the assembly in the direction for lowering the roof and, in the second configuration, any unintentional movement of said assembly in the direction for raising the roof at the risk of damaging the assembly by passage through zones with low ceiling height. This assembly, which is an assembly mounted by way of a pivoting connection, able to pivot about an axis transverse to the longitudinal axis of the chassis is a rigid assembly. This rigid assembly can be likened to a roll bar. The rigid assembly forms a roll bar substitute.

The floor of the lower part of the driver station extends between the front and rear wheels of the vehicle that are disposed along the same lateral side 6 of the vehicle. This floor forms a platform inside the enclosure, delimited by the upper part.

This floor may be bordered by at least two walls which prevent the operator having taken up position on the floor from being able to touch the wheels of the vehicle.

Figure 7:
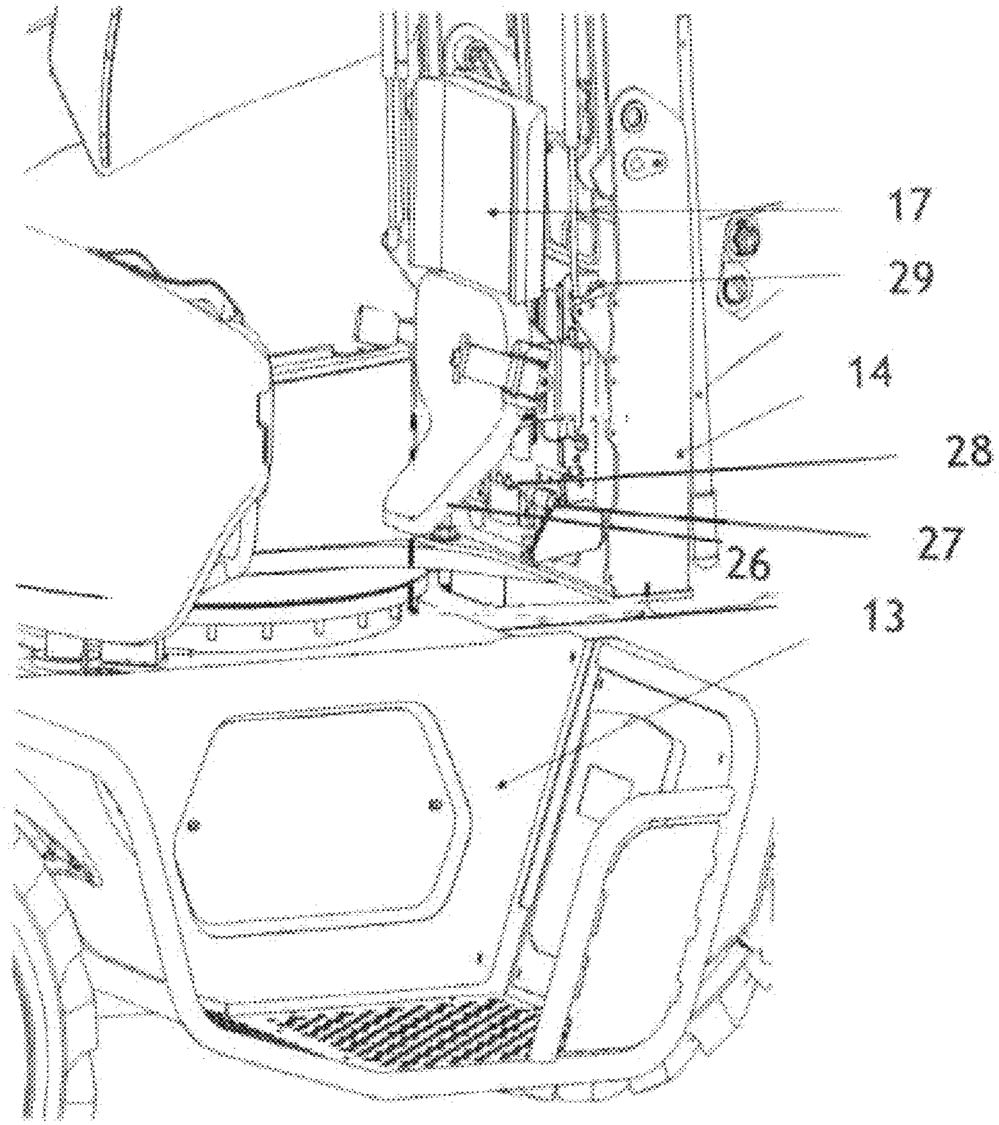
FIG. 7 shows a partial perspective view of the driver station, with the backrest in the upright position.
Figure 8:
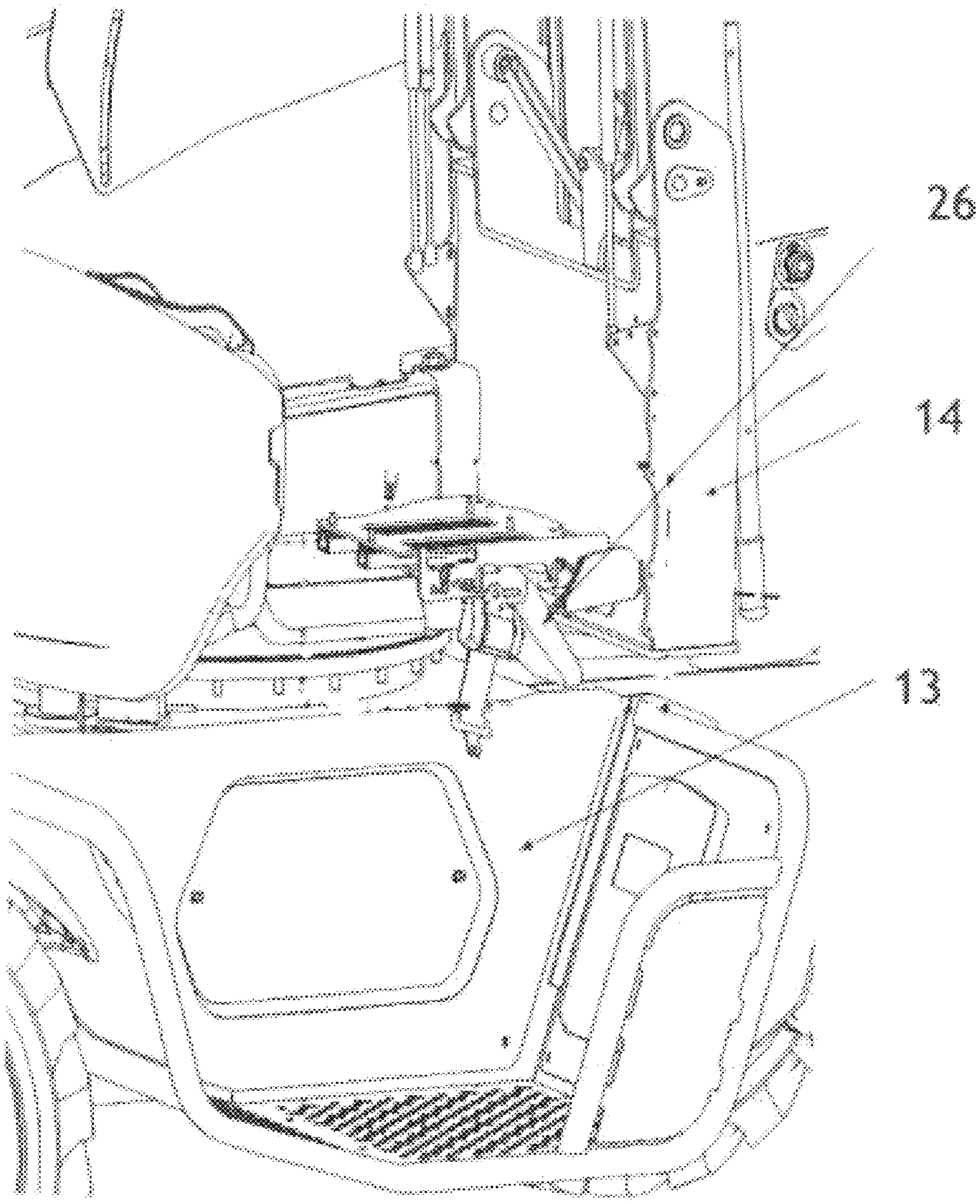
FIG. 8 shows a partial perspective view of the driver station, with the backrest in the lying-flat position.

The driver station may also comprise a seat pan 26 forming a seat. This seat pan 26 is generally disposed at the base of the backrest 17 as illustrated in FIGS. 2 and 7, for example. The backrest 17 or the assembly formed of the backrest 17 and of the seat pan 26 is mounted so as to be able to pivot about a pivot axis, referred to as horizontal, extending transversely with respect to the forward/rearward direction of the chassis. This backrest 17 is thus able to pass, by pivoting movement about its pivot axis 27, from an upright position, as illustrated in FIG. 7, in which the operator can take up position on the seat pan 26 and lean against the backrest 17 to a lying-flat position, as illustrated in FIG. 8, in which the seat pan 26 is no longer accessible and the backrest 17 prevents access to the driver station. In this lying-flat position of the backrest 17, access to the driver station is prevented.

The vehicle 1 comprises at least one sensor 28 for detecting the position of the backrest 17. Such a sensor 28, shown in FIG. 7, makes it possible to block the rotation of the turntable 8 when the backrest 17 is not in the lying-flat position. Thus, any risk of rotation of the turntable with the backrest 17 in the upright position is prevented. This sensor constitutes a safety member. To improve the assembly, the vehicle 1 may comprise a mechanism 29 for locking the backrest 17 in each of its positions.

Inside the driver station, the operator may be in a standing position with their feet resting on the floor and their back resting against the backrest, or in a semi-seated position, when a seat pan 26 is fitted at the base of the backrest.

The control console 121 is preferably configured to be fitted to the upper part 14 of the driver station 11.

Thus, if the vehicle comprises two driver stations 11 with a common upper part 14, the same control console 121 can be used for the two driver stations.

Likewise, the control console 121 may be non-removably installed inside the control station.

In a variant and as in the example shown, the control console can be removably coupled to the upper part of the driver station or stations 11 in at least two parts.

This control console 121 is, in the state decoupled from the driver station 11, able to form at least that system for controlling the handling system 7 which is configured to allow said handling system 7 of the vehicle to be controlled outside of the driver station or stations 11.

A sensor may be provided for detecting the coupling of the control console 121 to the driver station, and its presence inside said driver station.

To improve the vehicle 1, the vehicle 1 comprises, for each driver station in at least two parts, a system 18 for detecting the operational configuration of the driver station 11.

Thus, for example, the system 18 for detecting the operational configuration of the driver station may comprise an inductive sensor 19 and at least one metallic component 20.

The inductive sensor 19 and the metallic component 20 are fitted, without preference, the one to the turntable 8 and the other to the chassis 2.

When the upper part 14 is disposed above, and at least partially vertically with respect to, the lower part 13 of the control station 11, the inductive sensor 19 detects the metallic component 20 and a signal can be sent to a control unit of the vehicle 1. This control unit is in the form of an electronic computer system comprising, for example, a microprocessor and a working memory.

This control unit is configured to, upon reception of a signal from the detection system 18, permits control of rotational locking of the turntable 8 using a locking member which will be described below. It will specifically be appreciated that a rotation of the turntable 8 must be blocked when the driver station 11 in at least two parts is occupied by an operator.

To increase the safety, the vehicle 1 therefore comprises at least one member 21 for locking the upper part 14 of the or of at least one of the driver stations 11 in the operational configuration.

This locking member 21 is preferably formed, as in the example shown, by a locking finger that can be actuated by means of a control in the vehicle. This locking member, borne by the lower part or, respectively, the upper part of the driver station, may therefore be in the form of a finger which is locked in a recess provided in the upper part or, respectively, the lower part of the driver station.

The actuation of this locking member 21 for its passage from the unlocked position to the locked position is controlled by the operator, this locking being permitted when the control unit of the vehicle has received a signal from the detection system notifying that the driver station is positioned in the operational configuration.

Such mechanical locking prevents any misalignment between the upper part and the lower part of the driver station.

In the example shown, the locking finger is borne by the lower part 13 of the driver station and is inserted into a recess provided in the upper part 14 of the driver station. The locking finger and the associated recess form a tapered push-fit. The locking member forms, in cooperation with the associated recess, a stop configured to prevent an inclination of the upper part of the driver station toward the first or the second part of the chassis forming the front of the chassis. The tapered coupling allows the rotation of the upper part to be locked while generating mechanical support. Thus, when the operator is handling a load, the differences in behavior between the upper part and the lower part of the control station are not felt by the operator.

From a driver station in at least two parts, the operator can, from the control console 121 installed in said driver station, control the movement of the vehicle along the ground and the pivoting movement of the arm. In contrast, any rotational movement of the turntable is blocked.

The vehicle also comprises, for the or each driver station 11 in at least two parts, at least one presence sensor 22 in said driver station. This presence sensor 22 notably makes it possible, when no operator is detected in the driver station in at least two parts comprising such a sensor, to once again permit the rotation of the turntable.

In practice, the operation of the vehicle may be as follows: the operator, situated alongside the vehicle, controls, from the control console, the rotation of the turntable 8 to bring the upper part of the or of one of the driver stations into the operational configuration, that is to say at least partially above, and vertically with respect to, the lower part of said driver station.

When this position has been reached, and detected by the detection system 18, the operator can control, from the control console 121, the locking of the upper part by commanding the actuation of the locking member 21.

The control console 121 can then be installed in the driver station 11, when this control console has been removably mounted in the driver station 11. Otherwise, the operator can take up position in the driver station 11 and use the control console 121 positioned in the driver station 11, this control console 121 having been activated by the locking of the locking member.

In the case of a removable control console 121, a sensor makes it possible to detect the coupling of the control console 121 and its positioning inside the driver station 11.

Under these conditions, the vehicle may be controlled in terms of movement from the control console installed in the driver station, and the handling system may also be controlled, with the exception of the rotation of the turntable, which is blocked.

To permit a rotation of the turntable, the locking member 21 must be unlocked. This command is performed by the operator. It is not necessary to perform any presence detection in the driver station or stations in at least two parts and in the case of a removable control console, the control console does not have to be detected in the control station.

It should be noted that similar operation could be obtained with a vehicle fitted with several control consoles, one of which would be mounted permanently, for example on the upper part of the driver station or stations in at least two parts. In this case, the condition of the presence of the control console in the driver station in at least two parts is not examined for permitting or blocking the rotation of the turntable.

The invention claimed is:

1. A handling vehicle comprising:

a chassis fitted with members for driving movement along aground surface, the chassis having a first part and a second part that form, depending on a direction of movement of the chassis, a front and a rear of the chassis, and first and second lateral sides connecting the first part and the second part;

a handling system borne by the chassis, the handling system including a rotary turntable topped by a pivoting arm mounted to be pivotable on the turntable about a horizontal axis, the horizontal axis being orthogonal to a vertical axis of rotation of the turntable for movement of the pivoting arm between a lowered position and a raised position;

at least one driver station borne by the chassis in which an operator is able to take up a position;

at least one member for controlling the members for driving movement along the ground surface; and at least one control system for controlling the handling system, the at least one control system being configured to allow the handling system to be controlled outside of the at least one driver station, wherein the at least one driver station is in at least two parts, and each driver station includes a lower part secured to the chassis and disposed along one of the first and second lateral sides of the chassis and an upper part that moves with the turntable.

2. The handling vehicle of claim 1, wherein the at least one driver station is a first driver station and a second driver station, the first driver station and the second driver station each being in at least two parts, the lower part of the first driver station is disposed along and secured to the first lateral side of the chassis and the lower part of the second driver station is disposed along and secured to the second lateral side of the chassis, and the upper part of the first driver station and the upper part of the second driver station are common and are configured to cooperate with the lower parts depending on an angular position of the turntable.

3. The handling vehicle of claim 1, wherein the lower part of at least one of the driver stations includes a floor, and the upper part includes a backrest.

4. The handling vehicle of claim 1, wherein at least one of the driver stations has an operational configuration in which the upper part is disposed at least partially vertically above the lower part.

5. The handling vehicle of claim 4, further comprising at least one system for detecting the operational configuration of the driver station.

6. The handling vehicle of claim 5, wherein the system for detecting the operational configuration of the driver station includes an inductive sensor and a metallic component, and one of the inductive sensor or the metallic component is fitted to the turntable and the other to the chassis.

7. The handling vehicle of claim 4, further comprising at least one locking member for locking the upper part in the operational configuration.

8. The handling vehicle of claim 7, wherein the at least one locking member is formed by a locking finger.

9. The handling vehicle of claim 1, wherein each driver station has at least one presence sensor.

10. The handling vehicle of claim 1, wherein the at least one member for controlling the members for driving movement along the ground surface and the at least one system for controlling the handling system are integrated into a control console.

11. The handling vehicle of claim 10, wherein the control console is removably couplable to at least one of the upper or lower parts of at least one of the driver stations, and when the control console is decoupled from the driver station, the control system for controlling the handling system is configured to control the handling system from outside the driver station.

12. The handling vehicle of claim 1, wherein the members for driving movement along the ground surface are wheels, at least one of which is coupled to a drive system for rotatably driving the wheel.

13. The handling vehicle of claim 1, wherein the upper part of at least one of the driver stations includes a seat pan forming a seat.

14. The handling vehicle of claim 3, wherein the backrest is mounted to be pivotable about a horizontal pivot axis extending transversely with respect to a forward/rearward direction of the chassis.

15. The handling vehicle of claim 14, further comprising at least one sensor for detecting a position of the backrest.

16. A handling vehicle comprising:

a chassis movable along a ground surface;

a handling system supported by the chassis, the handling system including a turntable, and a pivoting arm pivotably mounted to the turntable, the pivoting arm being movable between a lowered position and a raised position;

a driver station supported by the chassis; and a control system to control the handling system, the handling system being remotely controllable from outside the driver station via the control system, wherein the driver station has a lower part secured to the chassis and an upper part movably linked to the turntable.

17. The handling vehicle of claim 16, wherein the lower part includes a floor, and the upper part includes a backrest.

18. The handling vehicle of claim 17, further comprising a sensor supported by the chassis, the sensor being configured to detect an operational configuration of the driver station in which the upper part is at least partially vertically above the lower part.

19. The handling vehicle of claim 17, further comprising a locking finger supported by the chassis, the locking finger being configured to lock the upper part to the lower part when the driver station is in an operational configuration in which the upper part is at least partially vertically above the lower part.

20. The handling vehicle of claim 16, further comprising a control console removably couplable to the driver station, wherein the control system is integrated into the control console.

* * * * *